United States Patent [19]

Blount

[11] Patent Number: 4,999,383

[45] Date of Patent: Mar. 12, 1991

[54] PROCESS FOR THE PRODUCTION OF FLAME-RETARDANT POLYURETHANE PRODUCTS

[76] Inventor: David H. Blount, 6728 Del Cerro Blvd., San Diego, Calif. 92120

[21] Appl. No.: 380,660

[22] Filed: Jul. 17, 1989

[51] Int. Cl.⁵ .............................................. C08G 18/14
[52] U.S. Cl. ................................... 521/103; 521/105; 521/107; 521/112; 521/124; 521/125; 521/163; 521/906
[58] Field of Search ............... 521/103, 105, 125, 124, 521/906, 107, 112, 163; 523/179

[56] References Cited

U.S. PATENT DOCUMENTS

| | | | |
|---|---|---|---|
| 3,629,308 | 12/1971 | Bailey et al. | 521/112 |
| 4,438,028 | 3/1984 | Schmittmann et al. | 521/906 |
| 4,587,273 | 5/1986 | Shimomura | 521/107 |
| 4,745,133 | 5/1988 | Grinbergs et al. | 521/163 |

Primary Examiner—Maurice J. Welsh

[57] ABSTRACT

Flame-retardant polyurethane products are produced by mixing a basic salt-forming compound with an acidic salt-forming compound containing boron compounds in a polyol and/or a polyisocyanate, then reacting the polyol and polyisocyanate.

The flame-retardant polyurethane products may be used for thermal and sound insulation, as a coating agent, as an adhesive, for caulking, for cushioning and for molding useful objects.

28 Claims, No Drawings

PROCESS FOR THE PRODUCTION OF FLAME-RETARDANT POLYURETHANE PRODUCTS

BACKGROUND OF THE INVENTION

This invention relates to a process for the production of flame-retardant polyurethane products by mixing acid boron salt-forming compounds and basic salt-forming compound in a polyol and/or a polyisocyanate, then reacting the polyol and polyisocyanate.

The production of polyurethane products is well known in the Arts any many types of flame-retardant chemicals have been used in the process. It is also known in the Arts that salts of boric acid are useful as a flame-retardant; and require the addition of other flame-retardants therefore, they are not very useful. In the novel process of this invention, only a small amount of acid boron compounds are necessary to produce a flame-retardant product because the molecules of the boric acid are small and very well distributed throughout the product. In the process of this invention, low-cost and readily available compounds are utilized and there is an improvement in the cost of the product, in the amount of flame-retardant needed, and in the production of inexpensive flame-retardant compounds.

While not wishing to be bound by any theory of operation, it appears that there may also be some reaction of the acid boron compounds with the basic salt forming compound, the polyol or polyisocyanate to give a much better and more stable distribution of boric acid and salts, thereby proving flame-retardant properties. Any excess of basic salt-forming compounds may be used as a filler or may be or may not be a reactant in the process. It takes an amount at least 3 to 5 times more when the salt of acid boron compound is added to the reactive mixture to produce flame-retardant polyurethane products than it does when the salt is produced as outlined in this invention. The flame-retardant boric acid and salt produced by the process of this invention is less expensive and at least equal to, or better than, the commercially available flame-retardant agents for polyurethane products in flame-retardant properties.

In the production of flame-retardant polyurethane products utilizing acid boron compounds it is necessary to utilize a basic compound to adjust the pH. Boric acid is a reaction retarder and slows down the chemical reaction therefore a satisfactory foam can not be produced unless the pH is elevated to above a pH of 6, preferably to above a pH of 7. The pH is elevated by adding a basic compound to the emulsion or mixture of the components. It is preferable that the basic compound does not react with the acid boron compound but in many of the mixtures of components some reaction takes place between them. When they react together only a minimum amount of the basic compound should be used. A combination of a basic compound which does not react with the acid boron compound and a basic compound which does react with the acid boron compound may be used so that free acid boron compound may be present in the reaction mixture.

SUMMARY OF THE INVENTION

Accordingly, the present invention process of the production of flame-retardant polyurethane products in which a first component is admixed with the active hydrogen-containing component or the polyisocyanate component, then a second component is admixed and may be partically reacted to form a salt which is well distributed in the form of very small particles. The component containing the active hydrogen and the polyisocyanate are admixed, thereby producing a flame-retardant polyurethane product.

The polyurethane products may contain as little as 7 percent by weight of boric acid and have good flame-retardant properties. The amount of acid boron compound that would normally be used ranges from 7 percent to 25 percent of the reactive mixture to produce flame-retardant polyurethane products.

When the pH is lowered by the addition of acidic boron compounds, it is necessary to add additional basic compounds to bring the pH back to the desired level in order to produce good products. Basic compounds may be used for this purpose, e.g., sodium hydroxide, potassium hydroxide, sodium carbonate, potassium carbonate, sodium silicate, sodium citrate, amines, amino compounds, ammonia, etc.

DETAILED DESCRIPTION

The flame-retardant compound utilized in this invention is produced by the reaction of a compound containing boron with water or an acid to produce boric acid. The boric acid is mixed with a basic salt forming compound in a polyol. The basic salt forming compound is necessary to adjust the pH to above a pH 7 because the boric acid acetic pH interferes with the production of polyurethanes. Since boric acid is a much better flame-retardant than salts of boric acid, it is preferred that the boric acid does not react with the basic salt forming compounds. When basic salt forming compounds do react with the boric acid only a small portion of boric acid should be utilized and most of the boric acid should remain as free boric acid until the polyurethane is produced.

Boric acid is the preferred boron compound to be mixed with a basic compound. When a foam contains more than 7 percent of boric acid which has been mixed with a basic compound in a polyol, then reacted with an aromatic polyisocyanate, it is a self-extinguishing foam. In rigid foam where aromatic polyurethanes are used, much less flame-retardant agent is necessary.

Flame-retardant polyurethane products may be produced by admixing the following components:
(A) Acid boron compound
(B) A basic salt-forming compound
(C) An active hydrogen-containing compound that will react with an isocyanate radical;
(D) A compound containing 2 or more isocyanate radicals.

COMPONENT A

Any suitable acidic boron compound may be used in this invention. Suitable acidic boron compounds include but not limited to orthoboric acid, metaboric acid, tetraboric acid, boric oxide plus water, boron halides plus water and mixtures thereof. Boric acid powder is the preferred acidic boron compound.

COMPONENT B

Any suitable basic compound that will adjust the pH to above 7 may be used in this invention. Suitable compounds include alkali metal compounds, alkaline earth metal compounds, metal compounds, ammonium compounds and mixtures thereof. These compounds are preferable in a fine powder form. An excess amount of these compounds may be used and utilized as a reactant and filler. It is preferable to use nature mineral products when available, to reduce the cost. Salts of acids stronger than boric acid such as salts of mineral acids are not suitable.

Suitable alkali metal compounds include compounds which contain sodium, potassium, lithium, rubidium and cesium. These compounds may be in the form of alkali metal, oxides, hydroxide, carbonates, salts or organic acids, bicarbonates, natural minerals, silicates, etc.

Suitable alkaline earth metal compounds and mixtures thereof include compounds which contain calcium, strontium, magnesium and barium. These compounds may be in the form of alkaline earth metal, oxides, hydroxides, carbonates, salts of organic acids, silicates, etc., and mixtures thereof.

Suitable metal compounds include compounds which contain beryllium, copper, zinc, titanium, zirconium, lead, arsenic, antimony, bismuth, molybdenum, tungsten, manganese, iron, nickel and cobalt. Suitable metal compounds include, but are not limited to, metals, oxides, hydroxides, carbonates, salts of organic acids, natural minerals, silicates, etc., and mixtures thereof.

Suitable ammonium compounds include, but are not limited to, compounds which contain ammonium radical, such as ammonia, amino compounds, e.g., urea, alkylureas, dicyandiamide, melamine, guanidine, aminoguanidine; amines, e.g., aliphatic amines, aromatic amine; organic ammonium salts, e.g., ammonium carbonate, quaternary ammonium hydroxide, ammonium silicate, and mixtures thereof. Ammonium compounds are the preferred salt-forming compound. It is also preferable to mix the ammonium compounds with other basic salt-forming compounds.

COMPONENT C

Any suitable compound that contains at least one active hydrogen, preferably 2 or more active hydrogen-containing compounds, that will react with isocyanate radical may be used in this invention.

The organic compounds having reactive hydrogens are understood to be not only compounds which contain amino groups, thiol groups or carboxyl groups, but particularly also polyhydroxyl compounds.

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4- and -2,3-glycol; propylene-1,2-and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae:
RSH, RCH$_2$CL, RCH$_2$Br, RCH$_2$I, RCN, RNO$_2$, RCOCL, RCOBr, RSO$_2$CL, RCOOH, RS$_3$OH, RCOO, RSO$_3$, ROR,

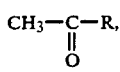

wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2–4 and is incorporated into this application. The polyepoxy compounds are well known in the Arts and are the preferred epoxy compound.

COMPONENT D

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:
wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6 diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

The flame-retardant polyurethane products may be produced under any suitable physical condition. The components may be mixed in any suitable physical condition. The components may be mixed in any suitable manner. They may be mixed simultaneously or Components A and B may be mixed with Component C and/or Component D. It is preferable to mix Components A and B in Component C, then mix with Component D at ambient temperature and pressure. The optional component may be added to the mixture of A, B and C before adding Component D. Optional components include, water, initiator, filler, dilutent, blowing agent, emulsifying agent, activator, foam stabilizer, modifying compounds, etc.

The proportions of the reactants and other compounds used in this invention may vary within the following ratios:
(a) 1 to 100 parts by weight of Component A;
(b) 1 to 200 parts by weight of Component B;
(c) 1 to 200 parts by weight of Component C;
(d) 25 to 100 parts by weight of Component D;
(e) Up to 50 percent by weight of an inert liquid, boiling in the range of $-25°$ C. to $80°$ C.;
(f) Up to 10 percent by weigth of activator (polyurethane catalyst);
(g) Up to 20 percent by weight of foam stabilizer;
(h) Up to 20 percent by weight of emulsifying agent;
(i) Up to 300 percent by weight of inorganic or organic particulate or pulverulent material;
(j) Up to 300 percent of a modifying compound;
(k) Up to 10 parts by weight of water
(l) Up to 25 percent by weight of phase-change material;
(m) Up to 5 percent by weight of a free-radical-initiator.

Percentages are based on weight of the reaction mixture.

When producing foams by the process according to the invention, blowing agents may be used, even when using NCO-prepolymers which give rise to the evolution of carbon dioxide. The blowing agents which are suitable for this purpose are inert liquids boiling within a range of $-25°$ C. to $+80°$ C. and preferably $-15°$ C. to $+40°$ C. They are used in quantities of 0–50 percent by weight, preferably 2–30 percent by weight when needed, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethyl-morphonine, N-cocomorpholine, N,N,N',N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N',N'-tetramethyl-1,3-butane diamine, N,N-dimethyl-B-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts. These amines and other basic catalyst may also be used to adjust the pH to above 7.

Organic metal compounds may also be used as catalysts according to the invention, particularly organic tin compounds.

The organic tin compounds used are preferably tin-(II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalytic amount, preferably in a quantity up to 10 percent by weight, based on the reactive mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5-12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethylene glycol) waxed and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorous containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide a novel process of producing flame-retardant polyurethane products. Another object is to produce novel flame-retardant polyurethane products. Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

DESCRIPTION OF PREFERRED EMBODIMENTS

My invention will be illustrated in greater detail by the specific examples which follow, it being understood that theses preferred embodiments are illustrative of, but not limited to, procedures which may be used in the production of flame-retardant polyurethane products. Parts and percentages are by weight unless otherwise indicated.

EXAMPLE 1

About 40 parts by weight of boric acid powder, 60 parts by weight of calcium carbonate powder, 5 parts by weight of water, 60 parts by weight of calcium carbonate powder and 100 parts by weight of a polypropylene triol, (mol. wt. 3,000, hydroxyl No. 56), are thoroughly mixed. After thorough mixing, a stable emulsion is formed containing boric acid, calcium carbonate, water and polyol. To the emulsion, 1 part by weight of a foam regulator (Dow 190), 0.25 parts by weight of tin octoate and 1 part by weight of triethylamine are admixed, then the emulsion is mixed with 45 parts by weight of tolylene diisocyanate (TDI by OLIN). The mixture expands to produce a flexible polyurethane foam of about 1.5 pound per cubic foot.

The foam was flame-tested with a ½-inch flame from a propane torch. The foam slowly burned. The flame traveled superficially with charring and there was a definite decrease in the amount of smoke when compared to burning flexible foam containing no flame-retardant. The foam was self-extinguishing as soon as a char was formed.

EXAMPLE 2

Example 1 is modified wherein another basic salt-forming compound powder is utilized in place of 50 percent by weight of the calcium carbonate and is selected from the list below, or mixtures thereof.

(a) calcium oxide;
(b) calcium hydroxide;
(c) calcium silicate;
(d) diethylenetriamine;
(e) clay;
(f) kaolin;
(g) sodium carbonate;
(h) sodium phosphate;
(i) sodium acetate;
(j) sodium bicarbonate;
(k) potassium bicarbonate;
(l) potassium carbonate;
(m) sodium silicate;
(n) potassium silicate;
(o) lithium silicate;
(p) Portland cement;
(q) aluminium hydroxide;
(r) barium hydroxide;
(s) ferric hydroxide;
(t) cadmium hydroxide;

(u) zinc hydroxide;
(v) cupric carbonate;
(w) magnesite ($MgCO_3$);
(x) dolomite ($MgCO_3 \cdot CaCO_3$);
(y) mixtures of the above.

EXAMPLE 3

Example 1 is modified wherein another polyisocyanate is used in place of tolylene diisocyanate and selected from the group below:
(a) Polymeric MDI (MONDUR MR by MOBAY);
(b) Polymeric MDI (PAPI 27 by UPJOHN);
(c) modified polyisocyanate (MONDUR T-442 by MOBAY);
(d) modified TDI with polyisocyanate (MONDUR MR by MOBAY);
(e) methylene diphenyl isocyanate;
(f) hexamethylene-1,6-diisocyanate.

With the use of polymeric MDI, MDI and other aromatic polyisocyanates in place of tolylene diisocyanate, there is a great improvement in the flame-retardant properties with more charr formation and self-extending properties. With an increase in the amount of basic compound as filler, there is a further improvement in the flame-retardant properties.

EXAMPLE 4

Example 1 is modified wherein the polyol is replaced with a polyol listed below:
(a) polypropylene triol, mol. wt. 3,000, hydroxyl No. 42;
(b) polypropylene triol, mol. wt. 3,500, hydroxyl No. 49;
(c) poly(oxyalkylene)triol, mol. wt. 3,000, hydroxyl No. 58;
(d) poly(oxyalkylene)triol, mol. wt. 3,500, hydroxyl No. 49;
(e) poly(oxyalkylene)triol, mol. wt. 4,800, hydroxyl No. 35;
(f) polypropylene diol, mol. wt. 1,275, hydroxyl No. 88;
(g) polypropylene diol, mol. wt. 2,000, hydroxyl No. 56.

EXAMPLE 5

Example 1 is modified where different amounts of boric acid are used, selected from the list below:
(a) 30 parts by weight;
(b) 50 parts by weight;
(c) 70 parts by weight;
(d) 45 parts by weight;
(e) 20 parts by weight;

EXAMPLE 6

About 25 parts by weight of boric acid powder, 30 parts by weight of sodium carbonate and 100 parts by weight of a polypropylene triol with hydroxyl No. 620 and viscosity, CPS at 25° C. —70° C. are mixed thereby producing a stable emulsion. To the emulsion, 1 part by weight of a foam regulator (Dow 193), 0.25 parts by weight of tin octoate, 2 parts by weight of an amine catalyst (DABCO-8,020 by Air Products) and 5 parts by weight of trichloromonofluoromethane are added, then mixed and agitated with 120 parts by weight of Polymeric MDI (PAPI 27 by UPJOHN). The mixture expands into a semi-flexible foam of about 2 pounds per cubic foot.

On flame-testing, the foam is self-extinguishing within 5 seconds after the flame is removed. A char is formed and the flame goes out.

EXAMPLE 7

Example 6 is modified wherein another powdered basic salt-forming compound is utilized in place of 50 percent by weight of sodium carbonate and is selected from the list below:
(a) strontianite powder ($Sr CO_3$);
(b) witherite ($Ba CO_3$);
(c) meerschalim (hydrated magnesium silicate);
(d) zeolite;
(e) Beryllium hydroxide;
(f) zinc oxide;
(g) zinc;
(h) feldspar;
(i) stannous hydroxide;
(j) lead hydroxide;
(k) lead carbonate;
(l) siderite ($FeCO_3$);
(m) cobalt hydroxide;
(n) nickel hydroxide;
(o) nickel carbonate;
(p) potassium carbonate;
(q) urea;
(r) mica;
(s) calcium carbonate;
(t) natolite ($Na_2Al_2Si_3O_{10}$);
(u) willemite ($Zn_2SiO_4$);
(v) calcium oxide;
(w) wollastonite ($CaSiO_3$);
(x) talc;
(y) tin;
(z) mixtures of the above.

EXAMPLE 8

Example 6 is modified wherein another triol or diol is used in place of the polypropylene triol and is selected from the list below:
(a) polypropylene triol, viscosity 750, hydroxyl No. 620;
(b) polypropylene triol, viscosity 241, hydroxyl No. 168;
(c) polypropylene triol, viscosity 270, hydroxyl No. 232;
(d) polypropylene triol, viscosity 310, hydroxyl No. 112;
(e) ethylene oxide/propylene oxide polyol, viscosity 857, hydroxyl No. 335.

EXAMPLE 9

Example 6 is modified wherein various amounts of boric acid are used and the amount is selected from the amounts below:
(a) 20 parts by weight;
(b) 25 parts by weight;
(c) 28 parts by weight;
(d) 32 parts by weight;
(e) 40 parts by weight.

EXAMPLE 10

About 25 parts by weight of boric acid powder, 20 parts by weight of hydrated aluminum hydroxide powder, and 100 parts by weight of a poly(oxyalkylene) polyol, viscosity 550, hydroxyl No. 380, are mixed, thereby producing an emulsion. About 1 part by weight of foam regulator (DOW 1931), 1 part by weight of tertiary amine (DABCO R 8020), 0.25 parts by weight of tinoctoate and 5 parts by weight of trichloromonofluoromethane are admixed with the emulsion, then admixed with 125 parts by weight of Polymeric MDI (MONDUR MR by MOBAY). The mixture expands to produce a rigid foam of about 2 pounds per cubic foot.

This foam has good flame-retardation properties, self-extinguishing, chars and won't burn any further. This foam was retested after 6 months and the foam was self-extinguishing. The flame would go out within 5 seconds after the flame was removed or after a char was formed with the flame still in place.

EXAMPLE 11

Example 10 is modified wherein the hydrated aluminum hydroxide is replaced by a compound listed below and 3 parts by weight of water added:
(a) calcium oxide;
(b) ammonium acetate;
(c) calcium acetate;
(d) sodium acetate;
(e) sodium carbonate;
(f) bismuth carbonate;
(g) potassium carbonate;
(h) potassium acetate;
(i) potassium citrate;
(j) lithium carbonate;
(k) barium oxide;
(l) zinc hydroxide;
(m) aluminium oxide;
(n) magnesium oxide;
(o) tin-acetate;
(p) lead hydroxide;
(q) nickel carbonate;
(r) iron oxide;
(s) lead acetate;
(t) pyrolusite ($MnO_2$);
(u) sodium tungstate;
(v) sodium manganate;
(w) cobalt hydroxide;
(x) nickel hydroxide;
(y) urea;
(z) mixtures of the above.

EXAMPLE 12

Example 10 is modified wherein a different polyol is used and is selected from the list below:
(a) Sucrose polyether polyol, hydroxyl No. 380;
(b) Sucrose amine polyol, hydroxyl No. 413;
(c) phenyl amine polyol, hydroxyl No. 350;
(d) poly(oxyalkylene)polyol, hydroxyl No. 380;
(e) polyester polyol, hydroxyl No. 275;
(f) aromatic polyester polyol, hydroxyl No. 405;
(g) chlorinated polyhydroxypolyether, hydroxyl No. 193;
(h) methyl glycoside-based polyol, hydroxyl No. 240;
(i) phenol-formaldehyde resin, hydroxyl No. 140;
(j) phenolyl-formaldehyde resin with furfuryl alcohol and melamine, hydroxyl No. 140;
(k) polyethylene oxide, monoalcohol with mol. wt. 782;
(l) urea-formaldehyde resin polyol 120;
(m) aromatic polyol, hydroxyl No. 375;
(n) arpine polyol, hydroxyl No. 475;
(o) sorbitol-based polyol, hydroxyl No. 490;
(p) polypropylene polyol with urea, hydroxyl No. 380;
(q) phosphorus-containing polyol (VIRCOL-82 by MOBIL) hydroxyl No. 205;
(r) mixtures of the above.

EXAMPLE 13

Example 10 is modified wherein the amount of boric acid powder used is selected from the list below:
(a) 10 parts by weight;
(b) 20 parts by weight;
(c) 30 parts by weight;
(d) 50 parts by weight;

EXAMPLE 14

About 30 parts by weight of boric acid powder and 20 parts by weight of calcium carbonate powder are admixed with 100 parts by weight of tolylene diisocyanate (TDI by Olin). About 60 parts by weight of this mixture are used in place of the TDI in Example 1, thereby producing a flame-retardant polyurethane flexible foam.

EXAMPLE 15

About 20 parts by weight of boric acid, 20 parts by weight of calcium carbonate powder and 1 part by weight of silicone foam stabilizer (DOW 190) are admixed with 100 parts by weight of a polyisocyanate selected from the list below, thereby producing a polyisocyanate emulsion containing boric acid and calcium carbonate:
(a) tolylene diisocyanate (TDI 180 by Olin);
(b) hexamethylene-1,6-diisocyanate;
(c) Polymeric MDI (MONDUR MR by MOBAY);
(d) methylene diphenyl isocyanate;
(e) Polymeric MDI (PAPI 27 by UPJOHN);
(f) tolylene-2,4-diisocyanate;
(g) modified polyisocyanate (MONDUR T-422 by MOBAY).

EXAMPLE 16

Example 15 is modified wherein the amount of boric acid powder is selected from the list below:
(a) 30 parts by weight;
(b) 50 parts by weight;
(c) 45 parts by weight.

EXAMPLE 17

Example 15 is modified wherein 5 parts by weight of a polyol are added with the boric acid powder and selected from the list below:
(a) ethylene glycol;
(b) diethylene glycol;
(c) propylene glycol;
(d) glycerol;
(e) dipropylene glycol;
(f) triethylene glycol;
(g) tripropylene glycol.

EXAMPLE 18

Example 15 is modified wherein the polyisocyanate prepolymer containing boric acid and calcium carbonate is reacted with 100 parts by weight of polyol containing 1 part by weight of triethylamine, 0.25 parts by weight of tin octoate and selected from the list below, thereby producing a flame-retardant polyurethane product:
(a) polypropylene triol, mol. wt. 3,000, hydroxyl No. 56;
(b) poly(oxyalkylene)triol, mol. wt. 4,800, hydroxyl No. 35;
(c) castor oil;
(d) aromatic polyester polyol, hydroxyl No. 350;

(e) ethylene oxide/propylene oxide polyol, hydroxyl No. 58;
(f) polypropylene diol, viscosity 93, hydroxyl No. 28;
(g) aromatic amine polyol, viscosity 14,000, hydroxyl No. 530;
(h) poly(oxyalkylene)polyol, hydroxyl No. 350;
(i) hydroxyl-terminated homopolymer of butadiene, hydroxyl No. 46.6, mol. wt. 2,800 (Poly bd R-45HT by Arco);
(j) Caprolactone diol, mol. wt. 2,000, hydroxyl No. 56;
(k) sucrose polyol, viscosity 30,000, hydroxyl No. 470;
(l) polyester resin, viscosity 8,000, hydroxyl No. 210;
(m) polyurea-filled polyol, viscosity 3,2000, hydroxyl No. 28;
(n) mixtures of the above.

The foam was flame-tested and it was self-extinguishing. The flame went out within 5 seconds after the flame was removed or on char formation.

EXAMPLE 19

Example 15 is modified wherein another basic salt-forming compound is used in place of calcium carbonate and selected from the list below:
(a) calcium oxide;
(b) calcium hydroxide;
(c) urea;
(d) sodium carbonate;
(e) potassium carbonate;
(f) potassium hydroxide;
(g) sodium silicate;
(h) potassium silicate;
(i) clay;
(j) talc;
(k) Portland cement;
(l) feldspar;
(m) antimony trioxide;
(n) melamine;
(o) sodium adipate;
(p) potassium oxalate;
(q) aluminium hydroxide;
(r) ammonium carbonate;
(s) sodium borate;
(t) titanium trioxide;
(u) zirconium oxide;
(v) lithium carbonate;
(w) bauxite;
(x) codazzite (Ca, Mg, Fe, Ce)CO$_3$;
(y) mixtures of the above.

EXAMPLE 20

Comparison flame-retardant studies were done, comparing the foam produced in Example 10 with foam produced by first reacting the boric acid and basic compounds to produce a salt, then adding the salt to the polyol before reacting with the polyisocyanate. The salts produced in Examples 10 and 11 were used:

| basic compound | boric acid powder in polyol | salt formed before adding to polyol |
|---|---|---|
| aluminium hydroxyl | self-extinguishing | burns |
| calcium oxide | self extinguishing | burns |
| calcium hydroxide | self-extinguishing | burns |
| sodium silicate | self-extinguishing | burns |
| sodium hydroxide | self-extinguishing | burns |
| potassium hydroxide | self-extinguishing | burns |
| potassium silicate | self-extinguishing | burns |
| lithium carbonate | self-extinguishing | burns |
| barium oxide | self-extinguishing | burns |
| zinc hydroxide | self-extinguishing | burns |
| magnesium hydroxide | self-extinguishing | burns |
| iron oxide | self-extinguishing | burns |
| sodium tongstate | self-extinguishing | burns |
| sodium manganate | self-extinguishing | burns |
| cobalt hydroxide | self-extinguishing | burns |
| nickel hydroxide | self-extinguishing | burns |

EXAMPLE 21

Example 6 is modified wherein 10 parts by weight of a modifying compound are added to the polyol and selected from the list below:
(a) styrene oxide;
(b) polyepoxy resin;
(c) polyester resin with methyl ethyl ketone peroxide;
(d) styrene with catalytic amount of potassium persulfate;
(e) isoprene with catalytic amount of potassium persulfate;
(f) melamine;
(g) phenoplast;
(h) aminoplast;
(i) cellulose powder;
(j) acetone;
(k) sodium silicate powder;
(l) fumed silica powder;
(m) perchloroethylene;
(n) polyester benzoate;
(o) gypsum powder;
(p) precipitated silica powder;
(q) polyepichlorohydrin polymer;
(r) vinyl acetate polymer;
(s) triallyl cyanurate;
(t) furfural-ketone resin;
(u) polysulfide polymer;
(v) furaldehyde;
(w) mixtures of the above.

EXAMPLE 22

Tolylene diisocyanate is reacted with hydroxyethyl methacrylate to produce a NCO-terminated prepolymer, then 30 parts by weight of the prepolymer is mixed with 6 parts by weight of hydrated aluminium hydroxide powder, 6 parts by weight of boric acid, 0.5 parts by weight of triethylamine, 0.1 parts by weight of tin octoate and a catalytic amount of organic hydroperoxide. The mixture cures into a flame-retardant microcellular foam.

EXAMPLE 23

About 30 parts by weight of a polyepoxy resin (glycidyl ether of dihydric phenol), 0.5 parts by weight of a foam stabilizer (L5420 by Union Carbide), 0.5 parts by weight of an amine urethane catalyst (DABCO R8020 by AIR PRODUCTS), 5 parts by weight of boric acid powder, 5 parts by weight of hydrated sodium silicate powder (G by PQ corp.) and 0.1 part by weight of tin octoate are mixed. This mixture is then mixed with 30 parts by weight of polymeric MDI (PAPI 27 by DOW). The mixture slowly expands to produce a strong rigid polyurethane foam of about 2-3 lbs./cu.ft.

EXAMPLE 24

Example 23 is modified wherein the polyepoxy resin is a phenol-formaldehyde resin containing epoxide radicals.

EXAMPLE 25

Example 23 is modified wherein 5 parts by weight of a polypropylene triol (Poly G 32-56 by OLIN) is added with the polyepoxy resin.

EXAMPLE 26

Example 6 is modified wherein about 5 parts by weight of a phase-change material, a mixture of paraffin waxes with a freezing (solidifying) point of about 70° F. and a melting point of about 72° F., is added in a liquid form and emulsified with the polyol.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process of preparing flame retardant polyurethane products by mixing and reacting:
   (A) acidic boron compound, in the amount of 1 to 100 parts by weight;
   (B) salt-forming basic compound utilized to adjust the pH of the reaction mixture to above 6 selected from the group consisting of metal containing compounds, ammonium-containing compounds and mixtures thereof, except for salts of acids stronger than boric acid, in the amount of 1 to 200 parts by weight;
   (C) compound containing one or more active hydrogen that will react a polyisocyanate compound, in the amount of 1 to 200 parts by weight;
   (D) organic polyisocyanate, in the amount of 1 to 200 parts by weight.

2. The process of claim 1 wherein the metal containing compound is an alkali metal compound selected from the group consisting of compounds containing sodium, potassium, lithium, rubidium, cesium and mixtures thereof, except for alkali metal salts of acids stronger than boric acid such as mineral acids.

3. The process of claim 1 wherein the metal containing compound is an alkaline earth metal compound selected from the group consisting of compounds containing calcium, magnesium, barium, strontium and mixtures thereof except for alkaline earth metal salts of acids stronger than boric acid such as mineral acids.

4. The process of claim 1 wherein the metal compound is selected from the group consisting of compounds containing berylluim, cooper, zinc, aluminium, tin, titanium, zircomium, lead arsenic, antimony, bismuth, molybdenum, tungsten, manganese, iron, nickel, cobalt and mixtures thereof, except for metal salts of acids stronger then boric acid such as mineral acids.

5. The process of claim 1 wherein the ammonium containing compounds are selected from the group consisting of ammonia, ammonium carbonate, amines, amino compounds, ammonia salts of organic acids, quaternary ammonium hydroxide, ammonium silicate and mixtures thereof, except for salts of acids stronger than boric acid such as mineral acids.

6. The process of claim 1 wherein the organic polyisocyanate are selected from the group consisting of aliphatic, cycloaliphatic, araliphatic, aromatic and heterocyclic polyisocyanates and mixtures thereof.

7. The process of claim 1 wherein the acidic boron compound is boric acid.

8. The process of claim 1 wherein up to 50 percent by weight of an inert liquid, boiling in the range of $-25°$ C. to 80° C., is included in the reaction mixture as a blowing agent and the reaction proceeds with concomitant foaming.

9. The product produced by the process of claim 1.

10. The foamed product produced by the process of claim 8.

11. The process of claim 1 wherein up to 10 percent by weight of polyurethane catalyst, selected from the group consisting of tertiary amines, organic tin compounds and mixtures thereof, is included in the reaction mixture.

12. The process of claim 1 wherein up to 20 percent by weight of a foam stabilizer is included in the reaction mixture.

13. The process of claim 1 wherein up to 20 percent by weight of emulsifying agent is included in the reaction mixture.

14. The process of claim 1 wherein an inorganic or organic particulate or pulverulent material is included in the reaction mixture.

15. The flame-retardant polyurethane product produced by mixing and reacting the following components:
   (A) boric acid, in the amount of 1 to 100 parts by weight;
   (B) hydrated sodium silicate utilized to adjust the pH to above 6, except for salts of acids stronger than boric acid, in the amount of 1 to 100 parts by weight;
   (C) Polyol, in the amount of 1 to 200 parts by weight;
   (D) Organic polyisocyanate, in the amount of 25 to 100 parts by weight.

16. The flame-retardant product produced by mixing and reacting the following components:
   (A) boric acid, in the amount of 1 to 100 parts by weight;
   (B) alkali metal silicate, utilized to adjust the pH to above 6, except for salts of acids stronger than boric acid, in the amount of 1 to 100 parts by weight;
   (C) Polyol, in the amount of 1 to 200 parts by weight;
   (D) Organic polyisocyanate, in the amount of 25 to 100 parts by weight;
   (E) water, in the amount of up to 10 parts by weight;
   (F) tertiary amine polyurethane catalyst, in the amount up to 10 percent by weight is included in the reaction mixture;
   (G) Organic tin polyurethane catalyst, in the amount up to 10 percent by weight is included in the reaction mixture;
   (H) foam stabilizer, in the amount up to 20 percent by weight is included in the reaction mixture.

17. The flame-retardant polyurethane product produced by mixing and reacting the following components:

(A) boric acid, in the amount of 1 to 100 parts by weight;

(B) amino compound, utilized to adjust the pH to above 6, except for salts of acids stronger than boric acid, in the amount of 1 to 100 parts by weight;

(C) polyol, in the amount of 1 to 200 parts by weight;

(D) organic polyisocyanate, in the amount of 25 to 100 parts by weight;

(E) foam stabilizer, in the amount up to 20 percent by weight is included in the reaction mixture;

(F) tertiary amine polyurethane catalyst, in the amount up to 10 percent by weight is included in the reaction mixture;

(G) organic tin polyurethane catalyst, in the amount up to 10 percent by weight is included in the reaction mixture;

(H) blowing agent for polyurethane resins, in an amount up to 50 percent by weight is included in the reaction mixture.

18. The process of claim 1 wherein the organic polyisocyanate is replaced with a compound containing 1 or more isocyanate radical and one or more unsaturated bond which will polymerize and a catalytic amount of a free-radical initiator.

19. The process of claim 1 wherein up to 25 percent by weight of phase-change material selected from the group consisting of crystalline alkyl hydrocarbons, fatty acids and fatty acid esters, are added to the components in liquid form, percentage based on the weight of the reaction mixture.

20. The process of claim 1 wherein a polyepoxy resin is used as component (C).

21. The flame-retardant polyurethane product of claim 17 wherein the amino compound is selected from the group consisting of urea, alkylurea, dicyandiamide, melamine, guanidine, aminoguanidine and mixtures thereof.

22. The flame-retardant polyurethane product produced by mixing and reacting the following components:

(A) boric acid powder, in the amount of 1 to 100 parts by weight;

(B) metal compound, utilized to adjust the pH to above 6, except for salts of acids stronger than boric acid, in the amount of 1 to 100 parts by weight;

(C) polyol, in the amount of 1 to 200 parts by weight;

(D) organic polyisocyanate, in the amount of 25 to 100 parts by weight;

(E) water, in the amount of up to 10 parts by weight;

(F) tertiary amine polyurethane catalyst, in the amount of up to 10 percent by weight is included in the reaction mixture;

(G) organic tin polyurethane catalyst, in an amount up to 10 percent by weight is included in the reaction mixture;

(H) blowing agent for polyurethane resins, in an amount up to 50 percent by weight is included in the reaction mixture;

(I) foam stabilizer, in an amount up to 20 percent by weight is included in the reaction mixture;

(J) emulsifier, in an amount up to 20 percent by weight is included in the reaction mixture.

23. The flame-retarded polyurethane product produced by mixing and reacting the following components:

(A) boric acid powder, in the amount of 1 to 100 parts by weight;

(B) ammonium containing compounds, utilized to adjust the pH to above 6, except for salts of acids stronger than boric acid, in the amount of 1 to 100 parts by weight;

(C) polyol, in the amount of 1 to 200 parts by weight;

(D) organic polyisocyanate, in the amount of 25 to 100 parts by weight;

(E) water, in the amount of up to 10 parts by weight;

(F) tertiary amine polyurethane catalyst, in an amount of up to 10 percent by weight is included in the reaction mixture;

(G) organic tin polyurethane catalyst, in an amount of up to 10 percent by weight is included in the reaction mixture;

(H) blowing agent for polyurethane resins in an amount of up to 50 percent by weight is included in the reaction mixture;

(I) foam stabilizer, in the amount of up to 20 percent by weight is included in the reaction mixture;

(J) emulsifier, in an amount up to 20 percent by weight is included in the reaction mixture.

24. The flame-retardant polyurethane product produced in claim 22 wherein the components with the exception of the organic polyisocyanate are first emulsified to produce a stable suspension then mixed with the organic polyisocyanate and reacted.

25. The flame-retardant polyurethane product produced in claim 23 wherein the components with the exception of the organic polyisocyanate are first emulsified to produce a stable emulsion then mixed and reacted with the organic polyisocyanate.

26. The flame-retardant polyurethane product produced in claim 23 wherein the ammonium containing product is selected from the group consisting of ammonia, ammonium carbonate, amines, amino compounds, ammonia salts of organic acids, quaternary ammonium hydroxide, ammonium silicate and mixtures thereof, except for salts of acids stronger than boric acid such as mineral acids.

27. The flame-retardant polyurethane product produced in claim 22 wherein the metal compound is selected from the group consisting of alkali metal compounds, alkaline earth metal compounds, compounds which contain beryllium, copper, aluminum, zinc, titanium, zirconium, lead, arsenic, antimony, bismuth, molybdenum, tungsten, manganese, iron, nickel, cobalt and mixtures thereof except for salts from acids stronger than boric acid such as mineral acids.

28. The product produced by the process of claim 19.

* * * * *